United States Patent
Asanai et al.

(10) Patent No.: US 6,185,071 B1
(45) Date of Patent: *Feb. 6, 2001

(54) HEAD SLIDER HAVING STREAMLINED PADS

(75) Inventors: Yoshimichi Asanai; Masaharu Sugimoto, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/020,759

(22) Filed: Feb. 9, 1998

(30) Foreign Application Priority Data

Sep. 4, 1997 (JP) .................................................... 9-239237

(51) Int. Cl.[7] ................................................... G11B 17/32
(52) U.S. Cl. ......................................................... 360/236.6
(58) Field of Search ............................... 360/103, 236.6, 360/121, 122

(56) References Cited

U.S. PATENT DOCUMENTS

| | | | |
|---|---|---|---|
| 5,067,037 | * 11/1991 | Ananth et al. | 360/103 |
| 5,079,657 | * 1/1992 | Aronoff et al. | 360/103 |
| 5,177,860 | * 1/1993 | Yura et al. | 360/103 X |
| 5,200,867 | * 4/1993 | Albrecht et al. | 360/103 |
| 5,285,337 | 2/1994 | Best et al. | 360/97.02 |
| 5,418,667 | 5/1995 | Best et al. | 360/103 |
| 5,473,485 | 12/1995 | Leung et al. | 360/103 |
| 5,499,149 | 3/1996 | Dovek | 360/103 |
| 5,742,451 | * 4/1998 | Kubota et al. | 360/103 |
| 5,768,055 | * 6/1998 | Tian et al. | 360/103 |
| 5,841,608 | * 11/1998 | Kasamatsu et al. | 360/103 |

FOREIGN PATENT DOCUMENTS 08321027  12/1996  (JP) .

* cited by examiner

Primary Examiner—Allen T. Cao
(74) Attorney, Agent, or Firm—Greer, Burns & Crain, Ltd.

(57) ABSTRACT

A magnetic head slider having an air inlet end an an air outlet end, and includes a pair of rails formed on a disk opposing surface opposed to a magnetic disk, each of the rails having a flat air bearing surface for generating a flying force during rotation of the disk, and an electromagnetic transducer formed on one of the rails in the vicinity of the air outlet end. The magnetic head slider further includes a plurality of streamlined pads formed on the air bearing surfaces of the rails in the vicinity of the air inlet end and in the vicinity of the air outlet end.

8 Claims, 11 Drawing Sheets

R:Radius of Arcuate Portion
$\theta \fallingdotseq |\theta 1| + |\theta 2|$
$\theta 1$:Inner Yaw Angle(+)
$\theta 2$:Outer Yaw Angle(−)
D1=D2=2R

FIG. 9A
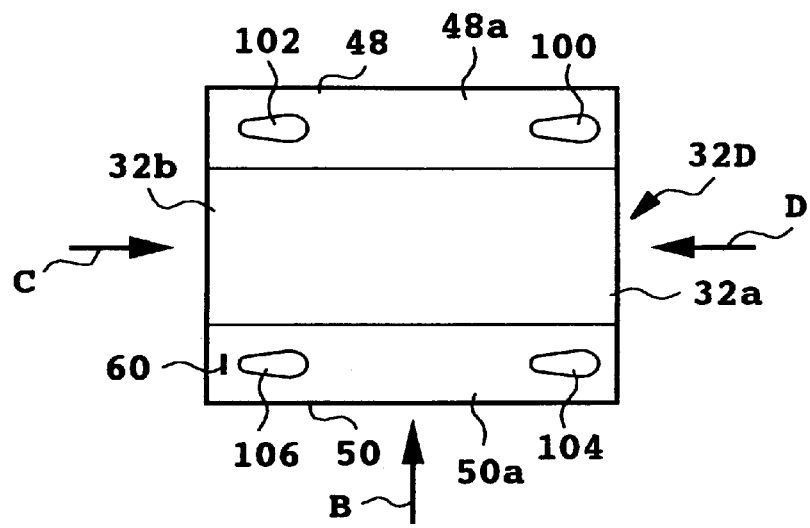
FIG. 9B
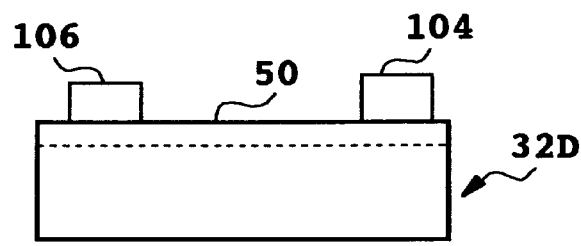
FIG. 9C  FIG. 9D
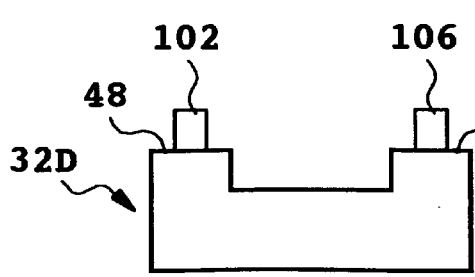 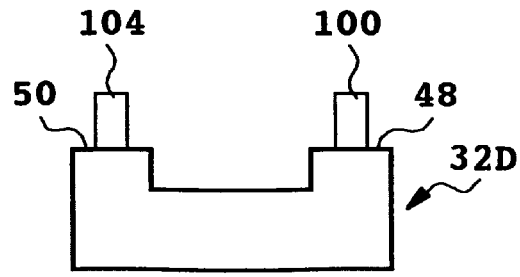

F I G. 1 1
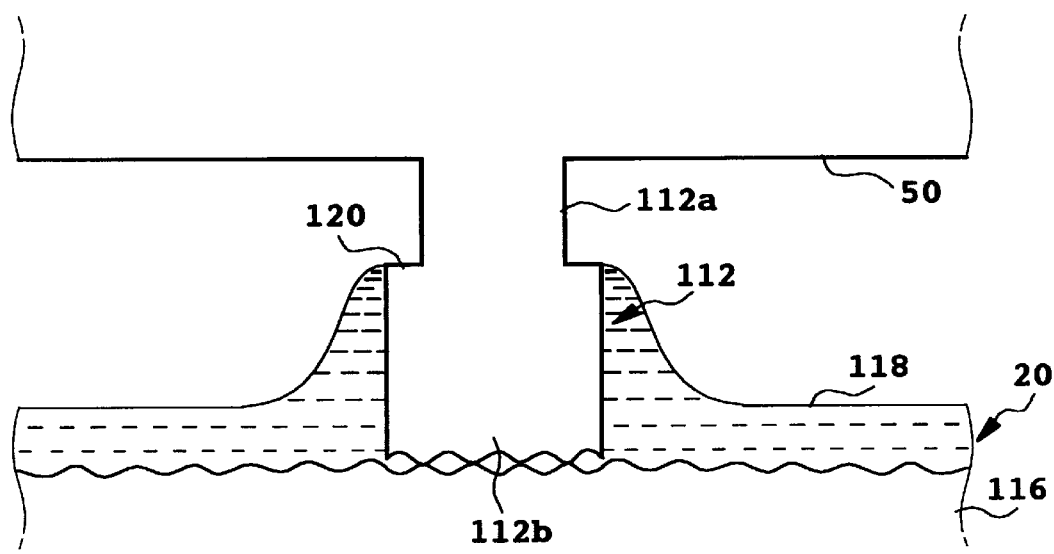

HEAD SLIDER HAVING STREAMLINED PADS

BACKGROUND OF THE INVENTION

1. Field of the Invention

The present invention relates to a structure of a flying type head slider used in a disk drive.

2. Description of the Related Art

In recent years, a reduction in size and an increase in capacity of a magnetic disk drive as a kind of external storage device for a computer have been desired. One method of increasing the capacity of the magnetic disk drive is to increase the number of magnetic disks mounted on a spindle, and in association therewith the spacing between the magnetic disks in a recent magnetic disk drive has increasingly been reduced. Further, a flying type head slider becomes to be used to apply a bias magnetic field in a magneto-optic disk drive. Particularly in a recent magnetic disk drive, a flying type magnetic head adopting a contact start and stop (CSS) system has been frequently used.

In such a flying type magnetic head adopting the CSS system, a magnetic head comes to contact with a magnetic disk when the disk drive stops operation, whereas the magnetic head is kept flying at a microscopic height from the disk surface by an air flow generating over the disk surface rotating at a high speed in recording or reproducing information.

In the flying type magnetic head adopting the CSS system, an electromagnetic transducer (magnetic head element) is built in a slider for receiving the air flow generating over the disk surface, and the slider is supported by a suspension. Accordingly, when the magnetic disk remains still, the slider including the electromagnetic transducer is in contact with the disk surface, whereas when the magnetic disk is rotated, a disk opposing surface of the slider opposed to the magnetic disk receives an air flow generated by rotation of the magnetic disk, and the slider flies from the disk surface. The electromagnetic transducer built in the slider is moved over the disk surface as being supported by the suspension to perform recording or reproduction of information at a given track.

In a magnetic disk drive employing a conventional flying type magnetic head slider, a pair of rails are provided on opposite side portions of a disk opposing surface of the magnetic head slider opposed to the disk surface. Each rail has a flat air bearing surface. Further, a tapering surface is formed on each rail so as to meet an air inlet end surface of the slider. The air bearing surface of each rail receives an air flow generated by high-speed rotation of a magnetic disk to fly the slider and stably maintains a microscopic distance between the disk surface and the electromagnetic transducer.

According to the CSS system, a high flying stability and a microscopic flying height (submicrons) can be ensured. However, when the disk remains still, rail surfaces (air bearing surfaces) of the slider are in contact with the disk. Accordingly, when the magnetic disk drive starts or stops operation, the air bearing surfaces relatively slide on the disk. To cope with such sliding, a protective film made of a hard material such as carbon and a lubricating layer for reducing friction and wear of the protective film to improve durability of the magnetic disk are formed on a recording layer of the disk. Owing to the presence of the lubricating layer, friction and wear of the protective film can be reduced; however, when the disk drive stops operation, there is a possibility that stiction between the disk and the slider may occur to cause a problem that the disk drive cannot be restarted.

In association with a recent increase in amount of information, the development in high density, large capacity, and small size of a magnetic disk drive has become remarkable, and the occurrence of stiction has been greatly highlighted as a cause of faulty operation due to a reduction in torque of a spindle motor in association with the size reduction and due to smoothing of the disk surface for the high density. To reduce the stiction between the slider and the disk, it has been proposed to perform crowning of the flying surfaces (rail surfaces) of the slider over the entire length in the longitudinal direction to thereby reduce a contact area between the slider and the disk.

While the slider thus crowned is effective for prevention of the stiction, there is a problem that variations in working accuracy are large and an increase in cost of the slider is invited, so that such a slider is unsuitable for mass production. Further, crowning is performed in the longitudinal direction of each flying surface of the slider, so that each rail surface of the slider becomes nearer to the disk than the electromagnetic transducer (head element) formed on an air inlet end surface of the slider, causing a problem that a spacing loss is produced.

Further, the use of a contact type head intended to attain a zero flying height has recently started to be considered in response to the development in high density, and it is therefore more important to prevent the stiction between the disk and the slider causing faulty operation and fracture of the electromagnetic transducer or the recording layer of the disk. To prevent this stiction problem, it has been proposed to provide a plurality of projections (pads) on the flying surfaces (air bearing surfaces) of the slider, thereby reducing a contact area between the slider and the disk surface (Japanese Patent Laid-open No. 8-69674).

The magnetic head slider described in this publication is characterized in that the plural pads are formed on the rails to avoid the direct contact between the rail surfaces (air bearing surfaces) of the slider and the magnetic disk surface. However, the conventional magnetic head slider with the pads has a problem such that when the magnetic disk drive is stopped and thereafter restarted, a frictional force and a sticking force between the slider and the magnetic disk surface are greatly increased in some case. This problem is considered to be due to the fact that the pads formed on the rails have scraped the lubricant present on the magnetic disk surface.

Such scraping of the lubricant by the pads may be suppressed by thinning each pad to reduce the sectional area thereof. However, each pad must have a sufficient sectional area to some degree because each pad wears at stopping and restarting the magnetic disk drive. Further, a decrease in contact area between each pad and the disk surface causes remarkable wearing of each pad and an increase in contact pressure between each pad and the magnetic disk. As a result, there is a possibility that the lubricant layer formed on the disk surface may be broken or the disk surface may be worn.

SUMMARY OF THE INVENTION

It is therefore an object of the present invention to provide a head slider which can suppress the scraping of the lubricant on the disk surface by the pads to thereby reduce a frictional force and a sticking force between the slider and the disk surface.

In accordance with an aspect of the present invention, there is provided a head slider having an air inlet end and an air outlet end, comprising a pair of rails formed on a disk opposing surface opposed to a disk, each of said rails having a flat air bearing surface for generating a flying force during rotation of said disk, and a tapering surface formed near said air inlet end continuously to said air bearing surface; and a plurality of pads formed on said air bearing surfaces of said rails in the vicinity of said air inlet end and in the vicinity of said air outlet end, each of said pads having a streamlined shape in horizontal section.

Owing to the streamlined shape of each pad, the scraping of the lubricant on the disk by the pads can be suppressed. Accordingly, a frictional force and a sticking force between the head slider and the disk surface due to the lubricant in restarting the disk drive can be reduced to thereby enable smooth restarting of the disk drive without the stiction problem. Preferably, each pad has a hole extending to the air bearing surface. In this case, a slight amount of the lubricant on the disk scraped by each pad can be held in the hole, thereby preventing the break of the lubricant layer on the disk surface by the pads.

In accordance with another aspect of the present invention, there is provided a head slider having an air inlet end and an air outlet end, comprising a pair of rails formed on a disk opposing surface opposed to a disk, each of said rails having a flat air bearing surface for generating a flying force during rotation of said disk; and a plurality of streamlined pads formed on said air bearing surfaces of said rails in the vicinity of said air inlet end and in the vicinity of said air outlet end; said pads formed in the vicinity of said air inlet end being higher in level than said pads formed in the vicinity of said air outlet end.

Owing to the configuration that the pads formed near the air inlet end are higher in level than the pads formed near the air outlet end, dust deposition on the rail surface in the CSS operation can be suppressed in spite of no tapering surface at the air inlet end portion of each rail. Further, since no tapering surface is formed on each rail, a manufacturing cost for the slider can be reduced.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 9A is a plan view of a magnetic head slider according to a fifth preferred embodiment of the present invention;

FIG. 9B is a view taken in the direction of an arrow B in FIG. 9A;

FIG. 9C is a view taken in the direction of an arrow C in FIG. 9A;

FIG. 9D is a view taken in the direction of an arrow D in FIG. 9A;

FIG. 11 is an enlarged view showing a pad in the sixth preferred embodiment and a magnetic disk in their contact condition.

DETAILED DESCRIPTION OF THE PREFERRED EMBODIMENTS

Figure 1:
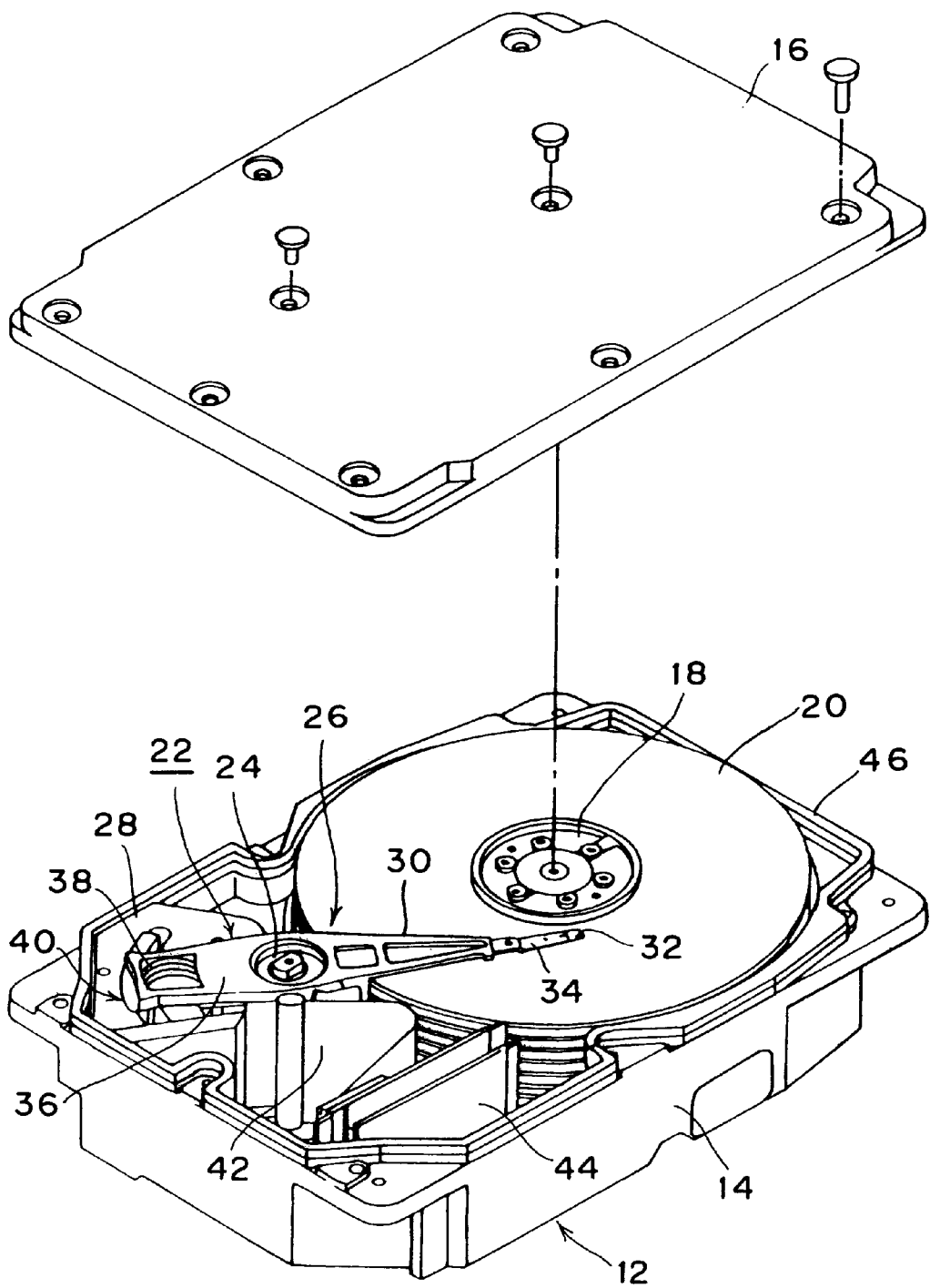
FIG. 1 is a perspective view of a magnetic disk drive according to the present invention.

Referring to FIG. 1, there is shown a perspective view of a magnetic disk drive in which a magnetic head slider according to the present invention is mounted. Reference numeral 12 denotes a housing (disk enclosure) consisting of a base 14 and a cover 16. A spindle hub (not shown) rotatably driven by an inner hub motor is provided on the base 14. A plurality of magnetic disks 20 and spacers (not shown) are mounted on the spindle hub in such a manner as to be alternately stacked. That is, the plural magnetic disks 20 are fixedly mounted on the spindle hub by securing a disk clamp 18 to the spindle hub by screws, and are equally spaced a given distance by the spacers.

Reference numeral 22 denotes a rotary actuator consisting of an actuator arm assembly 26 and a magnetic circuit 28. The actuator arm assembly 26 is mounted so as to be rotatable about a shaft 24 fixed to the base 14. The actuator arm assembly 26 includes a plurality of actuator arms 30 extending from the center of rotation in one direction and a coil supporting member 36 extending from the center of rotation in a direction opposite to the direction of extension of the actuator arms 30.

A suspension 34 is fixed at its base end portion to a front end portion of each actuator arm 30. A magnetic head slider 32 is supported to a front end portion of the suspension 34. A coil 38 is supported by the coil supporting member 36. The magnetic circuit 28 and the coil 38 inserted in a gap of the magnetic circuit 28 constitute a voice coil motor (VCM) 40.

Reference numeral 42 denotes a flexible printed circuit board (FPC) for taking a signal from an electromagnetic transducer mounted on the head slider 32. The flexible printed circuit board 42 is fixed at its one end by a fixing member 44, and is electrically connected to a connector (not shown). An annular packing assembly 46 is mounted on the base 14. The housing 12 is sealed by securing the cover 16 through the packing assembly 46 to the base 14 by screws.

Figure 2A:
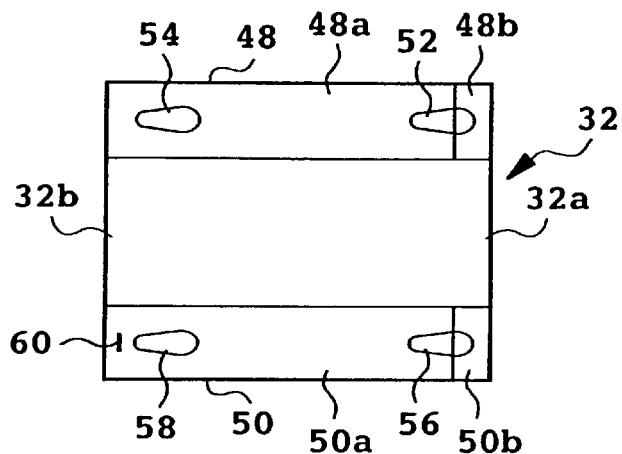
FIG. 2A is a plan view of a magnetic head slider according to a first preferred embodiment of the present invention.
Figure 2B:
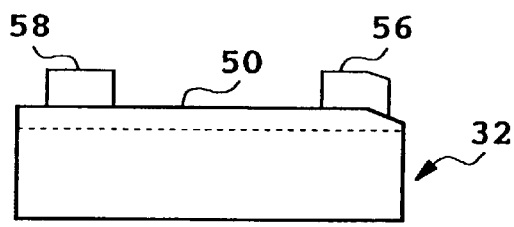
FIG. 2B is an elevational view of FIG. 2A.
Figure 2C:
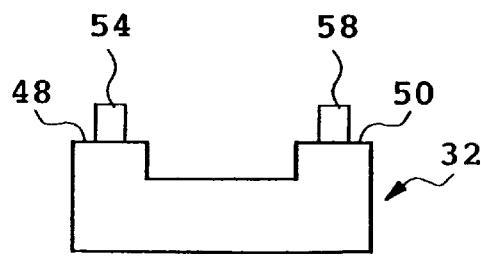
FIG. 2C is a left side view of FIG. 2A.

FIG. 2A is a plan view of a magnetic head slider 32 according to a first preferred embodiment of the present invention, FIG. 2B is an elevational view of FIG. 2A, and FIG. 2C is a left side view of FIG. 2A. The magnetic head slider 32 has an air inlet end 32a and an air outlet end 32b. A pair of rails 48 and 50 are formed at opposite side portions of the slider 32. The rails 48 and 50 have flat rail surfaces (air bearing surfaces) 48a and 50a, respectively. Tapering surfaces 48b and 50b are formed at air inlet end portions of the rails 48 and 50, respectively. An electromagnetic transducer (head element) 60 is formed on the rail 50 in the vicinity of the air outlet end 32b.

A pad (projection) 52 is formed on the rail 48 in the vicinity of the air inlet end 32a, and a pad 54 is formed on the rail 48 in the vicinity of the air outlet end 32b. Similarly, a pad 56 is formed on the rail 50 in the vicinity of the air inlet end 32a, and a pad 58 is formed on the rail 50 in the vicinity of the air outlet end 32b. As apparent from FIG. 2A, each of the pads 52, 54, 56, and 58 has a streamlined shape. That is, the horizontally sectional shape of each pad is streamlined. The pads 52, 54, 56, and 58 are formed from a thin film of hard material such as diamond-like carbon (DLC). The pads 52, 54, 56, and 58 are formed on the rails 48 and 50 through an SiC layer as an adhesion layer having a thickness of 5 nm or less by a thin film process. The height of each pad is set to a suitable value of about 30 nm having no adverse effect on flying of the slider 32.

According to this preferred embodiment, the streamlined pads 52, 54, 56, and 58 are formed on the rails 48 and 50, so that the scraping of a lubricant on the magnetic disk by the pads can be suppressed. As a result, the amount of the lubricant reaching the air bearing surfaces 48a and 50a of the rails 48 and 50 through the pads can be minimized, thereby reducing a frictional force and a sticking force between the slider and the magnetic disk.

Figure 3:
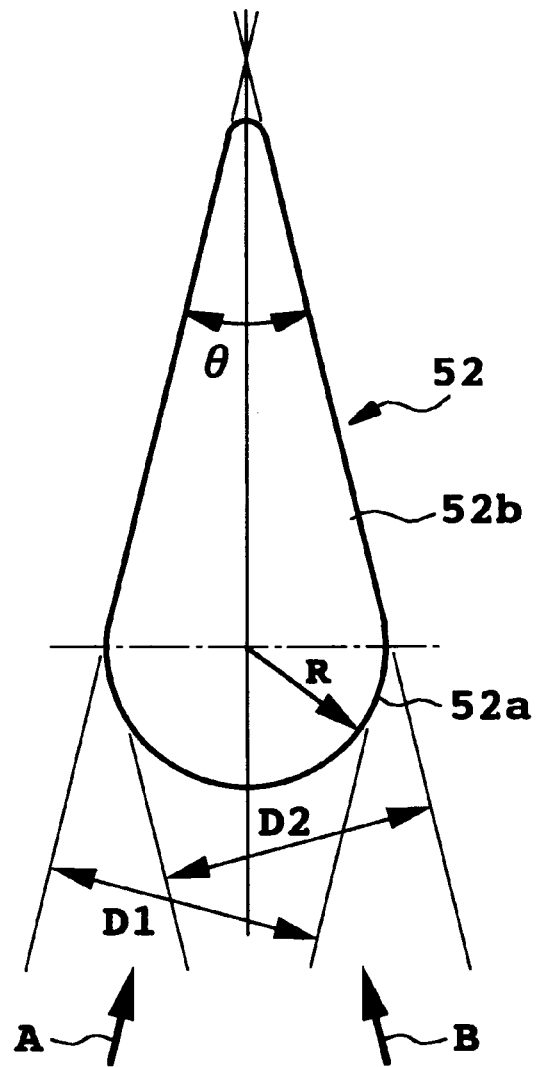
FIG. 3 is an enlarged plan view of a streamlined pad according to the present invention.

Referring to FIG. 3, there is shown an enlarged plan view of the streamlined pad 52. The streamlined pad 52 consists of a front arcuate portion 52a and a tapering portion 52b. The arrow A denotes an innermost air entering direction, and the arrow B denotes an outermost air entering direction. Letting R denote the radius of the front arcuate portion 52a, D1 denote the width of the pad 52 in a direction perpendicular to the innermost air entering direction A, and D2 denote the width of the pad 52 in a direction perpendicular to the outermost air entering direction B, the relation of D1=D2=2R holds.

Further, letting θ1 and θ2 denote the inner yaw angle and the outer yaw angle of the disk drive, respectively, the tapering angle θ of the tapering portion 52b is nearly equal to the sum of the absolute value of the inner yaw angle θ1 and the absolute value of the outer yaw angle θ2. That is, the relation of θ≈|θ1|+|θ2| holds. Each of the other streamlined pads 54, 56, and 58 has a similar shape. At any angle of entrance of the air to the streamlined pad 56 falling between the inner yaw angle θ1 and the outer yaw angle θ2, the width of the pad 52 in a direction perpendicular to the air entering direction becomes always equal to the diameter of the front arcuate portion 52a, thereby minimizing conditions of scraping the lubricant on the disk and conditions of air resistance.

Figure 4A:
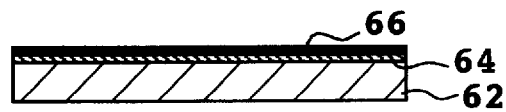
FIGS. 4A to 4H are sectional views showing a fabrication method for the magnetic head slider.

A fabrication method for the slider 32 of the first preferred embodiment will now be described with reference to FIGS. 4A to 4H and FIGS. 5A to 5D. A wafer 61 shown in FIG. 5A is formed with a plurality of electromagnetic transducers 60. The wafer 61 is cut to obtain a bar-shaped $Al_2O_3$ TiC substrate 62. As shown in FIG. 4A, an adhesion layer 64 of SiC having a thickness of about 2 nm is formed on the substrate 62 by sputtering. Next, a diamond-like carbon layer (DLC layer) 66 having a thickness of about 30 nm is formed on the adhesion layer 64 by plasma CVD. The SiC layer 64 serves both as an insulation protection layer for the electromagnetic transducer 60 and as an adhesion layer for the DLC layer 66.

Figure 4B:
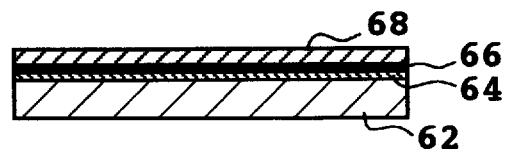
Figure 4C:
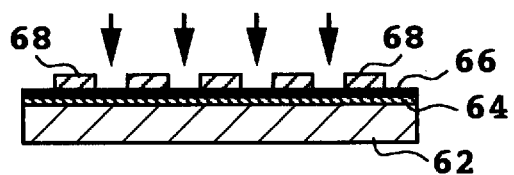
Figure 4D:
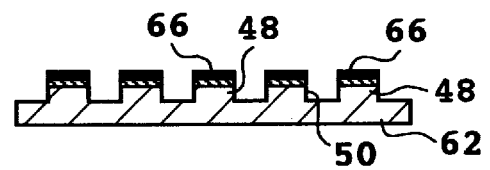
Figure 4E:
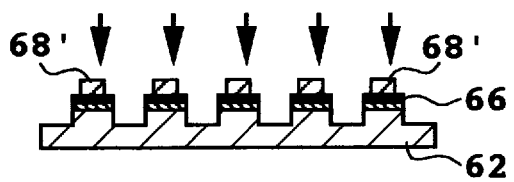
Figure 4F:
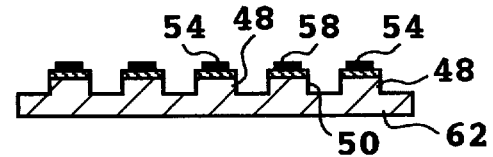
Figure 4G:
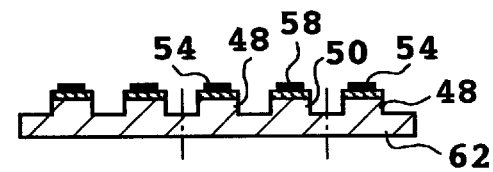
Figure 4H:
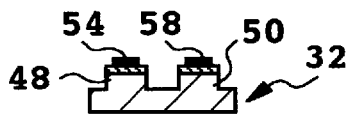
Figure 5A:
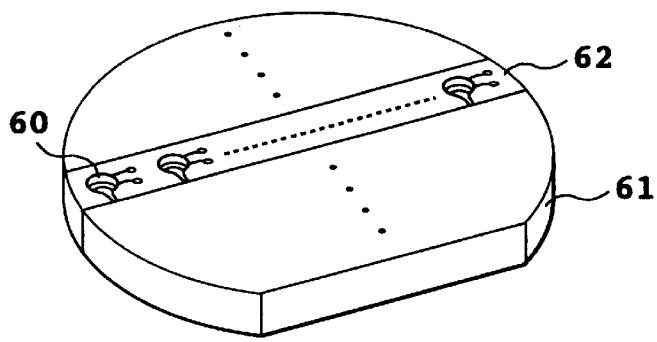
FIGS. 5A to 5D are perspective views showing the fabrication method shown in FIGS. 4A to 4H.
Figure 5B:
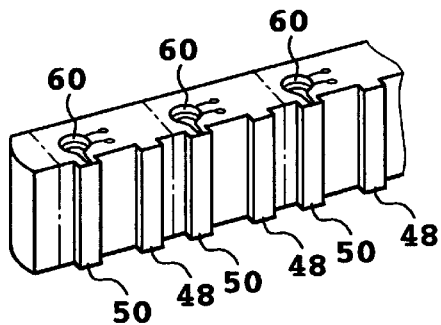
Figure 5C:
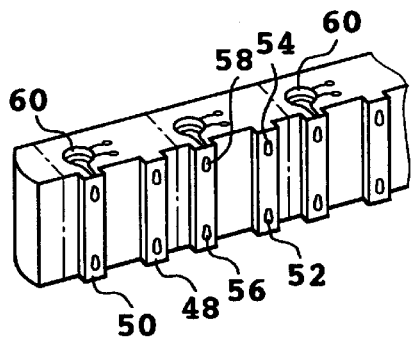
Figure 5D:
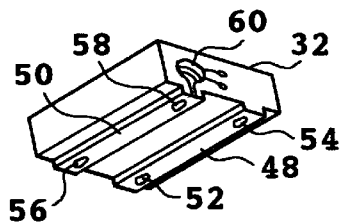

As shown in FIG. 4B, a photoresist 68 is applied to the DLC layer 66, and as shown in FIG. 4C, the photoresist 68 is next exposed to light and developed by using a mask with a given pattern. As shown in FIG. 4D, the substrate 62 is etched by ion milling to form a plurality of rails 48 and 50. This condition is shown in perspective in FIG. 5B. Next, a photoresist 68' is applied again, and it is next exposed to light to form a pad pattern as shown in FIG. 4E. Next, a portion of the DLC layer 66 except the pad pattern is etched off by ion milling as shown in FIG. 4F.

As a result, a plurality of pads 52, 54, 56, and 58 of DLC are formed on the rails 48 and 50. This condition is shown in perspective in FIG. 5C. Next, the substrate 62 is cut along phantom lines shown in FIG. 4G to thereby obtain individual sliders 32, one of which is shown in cross section in FIG. 4H and shown in perspective in FIG. 5D.

While the DLC film formed by plasma CVD is used as the material for the pads 52, 54, 56, and 58 in the above preferred embodiment, an amorphous carbon film such as a carbon film, carbon hydroxide film, and silicon-added carbon film formed by sputtering may be used. Further, a thin oxide film such as an $SiO_2$ film and $Al_2O_3$ film may also be used as the material for the pads 52, 54, 56, and 58 to be formed on the rails 48 and 50. Since $SiO_2$ and $Al_2O_3$ are dense and hard, these materials are suitable as the material for the pads 52, 54, 56, and 58. Such a thin oxide film that can endure contact and slide between the slider 32 and the disk may be used as the material for the pads 52, 54, 56, and 58 to be formed on the rails 48 and 50.

Figure 6:
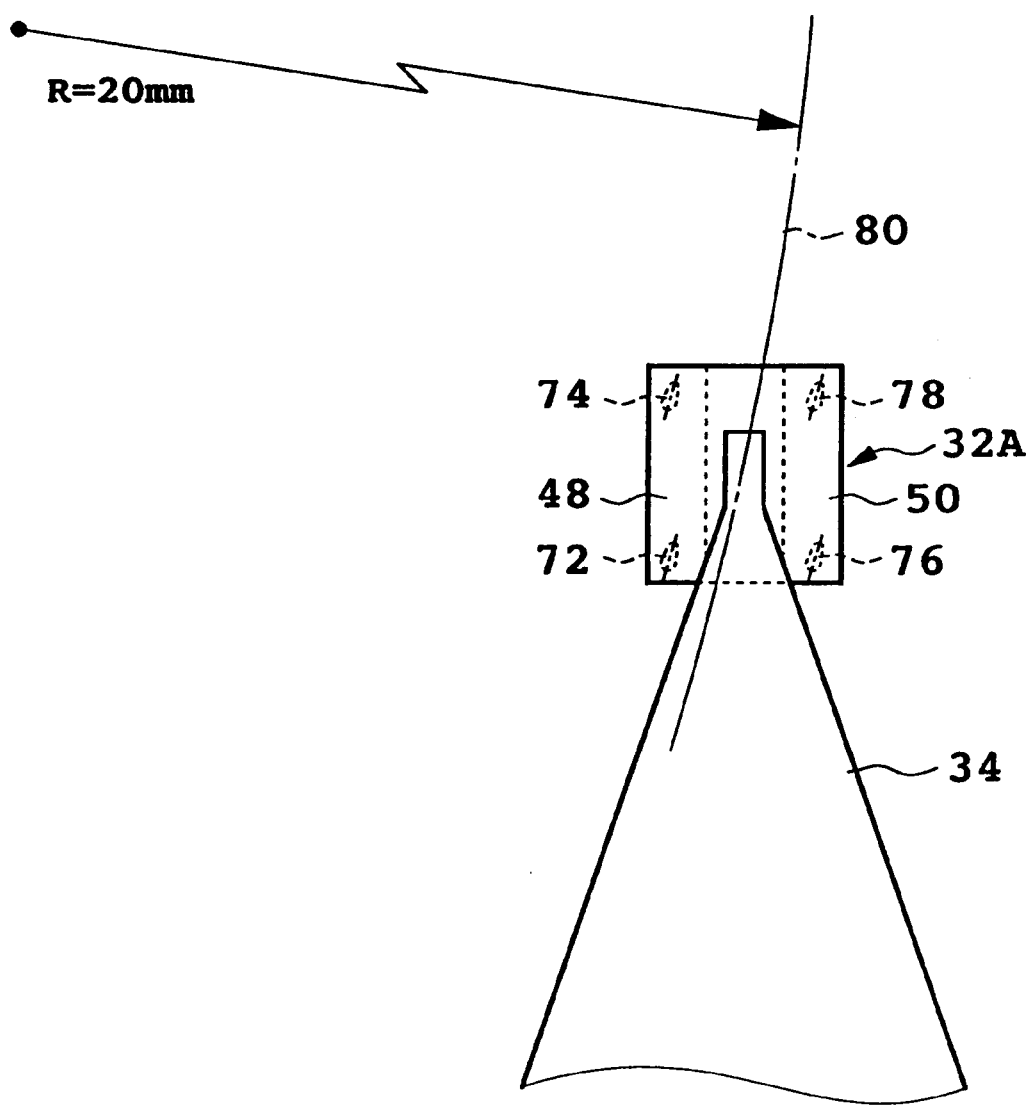
FIG. 6 is a plan view showing the relation between a magnetic head slider according to a second preferred embodiment of the present invention and a CSS track.

FIG. 6 shows the relation between a magnetic head slider 32A according to a second preferred embodiment of the present invention and a CSS track 80 in a CSS zone of the magnetic disk 20. The CSS track 80 has a radius R of about 20 mm from the center of the magnetic disk 20. The magnetic head slider 32A in this preferred embodiment has streamlined pads 72, 74, 76, and 78 inclined a given angle to the longitudinal center line of the slider 32A. As shown in FIG. 6, the longitudinal center lines of the streamlined pads 72, 74, 76, and 78 are inclined to the longitudinal center line of the slider 32A so as to extend in a direction substantially coinciding with the tangential direction of the CSS track 80.

In other words, the pads 72, 74, 76, and 78 are formed so that the angle of inclination of each pad is set substantially equal to the yaw angle of the slider 32A at a position (CSS zone) where the slider 32A comes to sliding contact with the magnetic disk. By this setting of the inclination angle, the streamlined pads 72, 74, 76, and 78 slide on the surface of the magnetic disk as in ice skating when the slider 32A comes to sliding contact with the magnetic disk. Accordingly, the CSS operation can be smoothly performed to thereby reduce the wear of the disk surface and minimize the scraping of the lubricant on the magnetic disk by the pads.

Figure 7A:
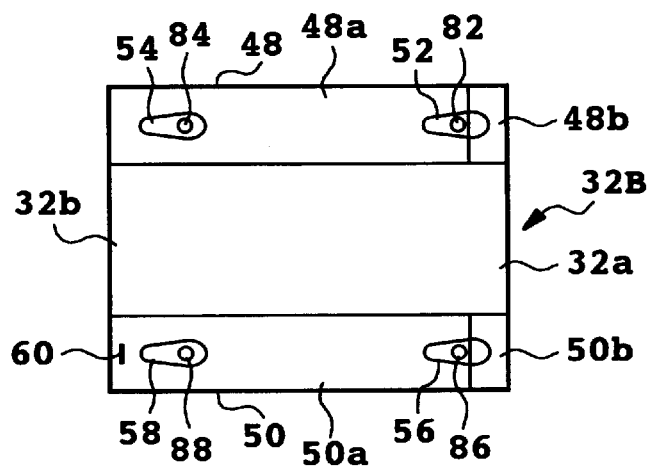
FIG. 7A is a plan view of a magnetic head slider according to a third preferred embodiment of the present invention.
Figure 7B:
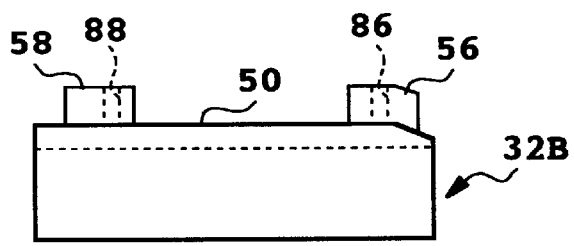
FIG. 7B is an elevational view of FIG. 7A.
Figure 7C:
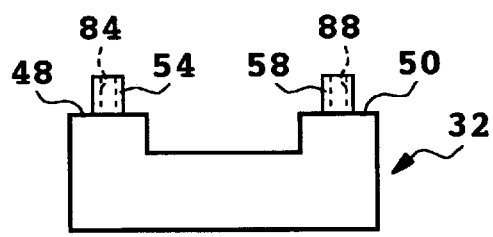
FIG. 7C is a left side view of FIG. 7A.

FIG. 7A is a plan view of a magnetic head slider 32B according to a third preferred embodiment of the present invention, FIG. 7B is an elevational view of FIG. 7A, and FIG. 7C is a left side view of FIG. 7A. The magnetic head slider 32B in this preferred embodiment has four streamlined pads 52, 54, 56, and 58 substantially similar in external shape to those of the magnetic head slider 32 in the first preferred embodiment shown in FIGS. 2A to 2C. The streamlined pads 52, 54, 56, and 58 of the slider 32B has holes 82, 84, 86, and 88, respectively. The holes 82 and 84 of the streamlined pads 52 and 54 extend to the air bearing surface 48a in perpendicular relationship thereto, and the holes 86 and 88 of the streamlined pads 56 and 58 extend to the air bearing surface 50a in perpendicular relationship thereto.

Owing to the holes 82, 84, 86, and 88 formed in the streamlined pads 52, 54, 56, and 58, a slight amount of lubricant on the magnetic disk scraped by the streamlined pads 52, 54, 56, and 58 can be held in the holes 82, 84, 86, and 88. As a result, a frictional force and a sticking force between the slider and the magnetic disk can be further reduced. Since the lubricant is held in the holes 82, 84, 86, and 88 of the streamlined pads 52, 54, 56, and 58, the lubricant film on the magnetic disk can also be prevented from being broken. The holes 82, 84, 86, and 88 may be formed simultaneously with the streamlined pads 52, 54, 56, and 58 by etching such as ion milling.

Figure 8A:
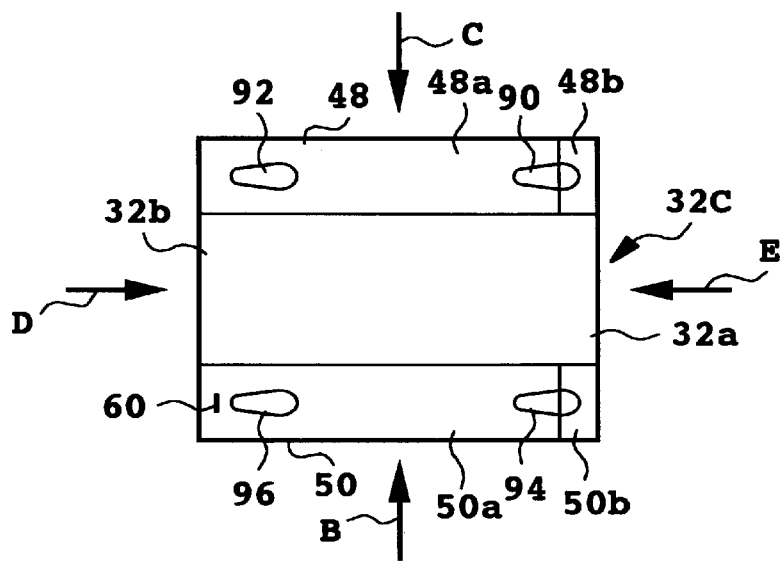
FIG. 8A is a plan view of a magnetic head slider according to a fourth preferred embodiment of the present invention.
Figure 8B:
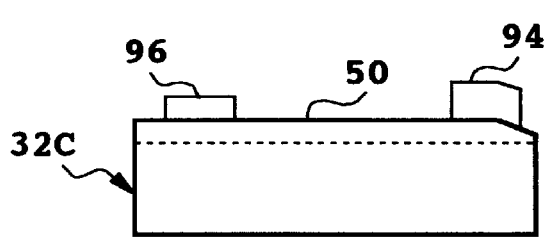
FIG. 8B is a view taken in the direction of an arrow B in FIG. 8A.
Figure 8C:
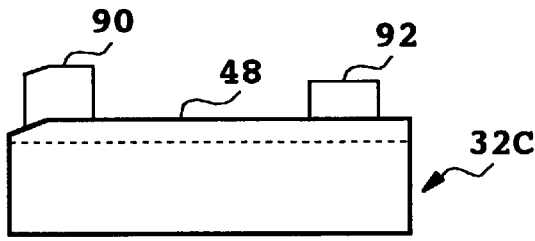
FIG. 8C is a view taken in the direction of an arrow C in FIG. 8A.
Figure 8D:
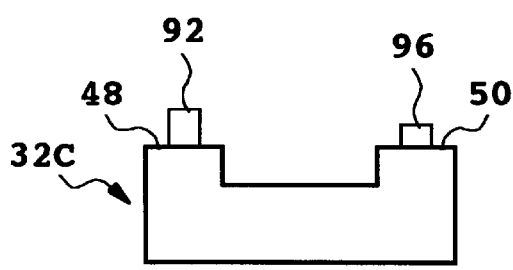
FIG. 8D is a view taken in the direction of an arrow D in FIG. 8A.
Figure 8E:
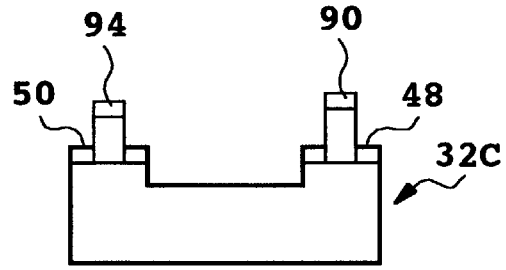
FIG. 8E is a view taken in the direction of an arrow E in FIG. 8A.

FIG. 8A is a plan view of a magnetic head slider 32C according to a fourth preferred embodiment of the present invention, FIG. 8B is a view taken in the direction of an arrow B in FIG. 8A, FIG. 8C is a view taken in the direction of an arrow C in FIG. 8A, FIG. 8D is a view taken in the direction of an arrow D in FIG. 8A, and FIG. 8E is a view taken in the direction of an arrow E in FIG. 8A.

In this preferred embodiment, two streamlined pads 90 and 92 are formed on the rail 48, and two streamlined pads 94 and 96 are formed on the rail 50. As apparent from FIGS. 8D and 8E, the pads 90 and 94 formed near the air inlet end 32a are higher in level than the pads 92 and 96 formed near the air outlet end 32b. Further, as apparent from FIGS. 8B and 8C, the pads 94 and 96 formed on the rail 50 having the electromagnetic transducer 60 are lower in level than the pads 90 and 92 formed on the rail 48. Since the heights of the pads 94 and 96 on the rail 50 having the electromagnetic transducer 60 are smaller than the heights of the pads 90 and 92, the flying height of the electromagnetic transducer 60 during operation of the magnetic disk drive can be suppressed.

Further, since the pads 90 and 94 near the air inlet end 32a are higher in level than the pads 92 and 96 near the air outlet end 32b, the position of the slider 32C in the unrotational condition of the disk is kept tilted in such a manner that the air inlet end 32a is raised more than the air outlet end 32b. As a result, the slider 32C can easily fly at starting of the disk drive, thereby allowing a reduction in sliding distance of the slider 32C relative to the disk. Further, since the heights of all the pads 90, 92, 94, and 96 are different, they can be formed extremely near the air inlet end 32a and the air outlet end 32b, thereby allowing stable placement of the slider 32C on the magnetic disk. Further, since the streamlined pad 96 can be formed in the vicinity of the electromagnetic transducer 60, collision of the electromagnetic transducer 60 with the disk surface can be avoided.

FIG. 9A is a plan view of a magnetic head slider 32D according to a fifth preferred embodiment of the present invention, FIG. 9B is a view taken in the direction of an arrow B in FIG. 9A, FIG. 9C is a view taken in the direction of an arrow C in FIG. 9A, and FIG. 9D is a view taken in the direction of an arrow D in FIG. 9A.

In this preferred embodiment, streamlined pads 100 and 102 are formed on the rail 48, and streamlined pads 104 and 106 are formed on the rail 50. As apparent from FIGS. 9C and 9D, the pads 100 and 104 formed near the air inlet end 32a have the same height, and the pads 102 and 106 formed near the air outlet end 32b have the same height. The pads 100 and 104 are higher in level than the pads 102 and 106.

The rails 48 and 50 have no tapering surfaces meeting the air inlet end 32a. Since the pads 100 and 104 near the air inlet end 32a are higher in level than the pads 102 and 106 near the air outlet end 32b, dust deposition on the rail surfaces (air bearing surfaces) 48a and 50a in the CSS operation can be suppressed in spite of the configuration that no tapering surfaces are formed at the air inlet end portions of the rails 48 and 50. Since no tapering surfaces are formed, a manufacturing cost for the slider can be reduced.

Figure 10A:
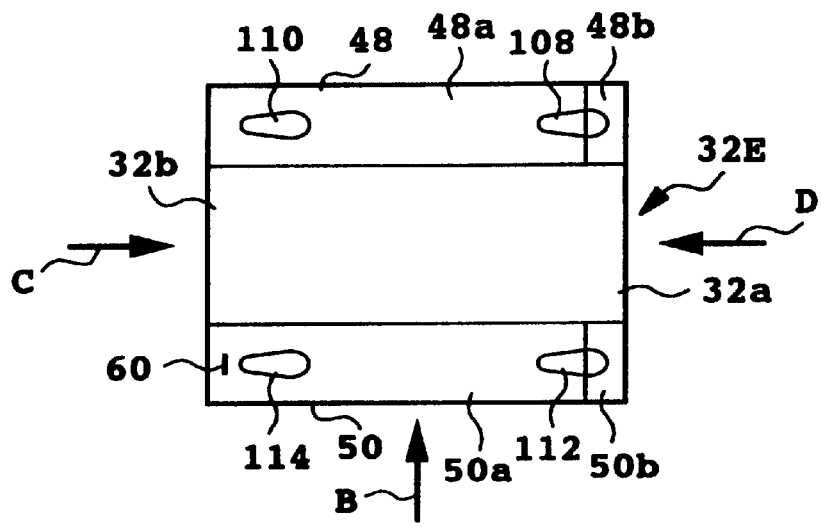
FIG. 10A is a plan view of a magnetic head slider according to a sixth preferred embodiment of the present invention.
Figure 10B:
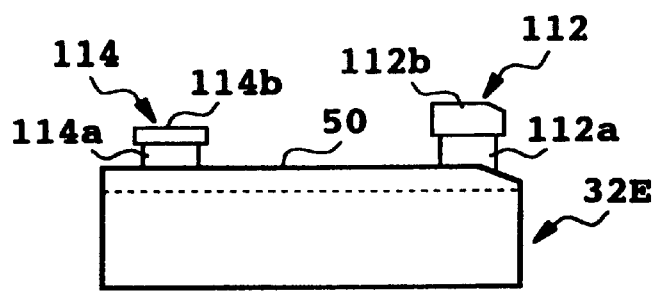
FIG. 10B is a view taken in the direction of an arrow B in FIG. 10A.
Figure 10C:
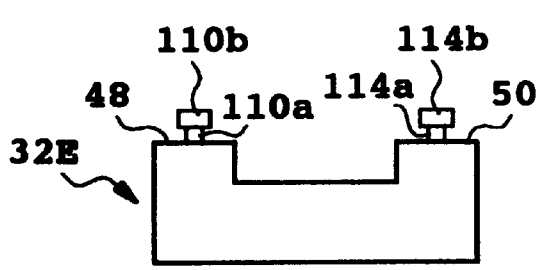
FIG. 10C is a view taken in the direction of an arrow C in FIG. 10A.
Figure 10D:
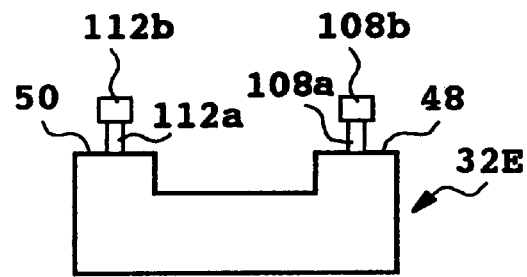
FIG. 10D is a view taken in the direction of an arrow D in FIG. 10A.

FIG. 10A is a plan view of a magnetic head slider 32E according to a sixth preferred embodiment of the present invention, FIG. 10B is a view taken in the direction of an arrow B in FIG. 10A, FIG. 10C is a view taken in the direction of an arrow C in FIG. 10A, and FIG. 10D is a view taken in the direction of an arrow D in FIG. 10A.

In this preferred embodiment, streamlined pads 108 and 110 are formed on the rail 48, and streamlined pads 112 and 114 are formed on the rail 50. As apparent from FIGS. 10B to 10D, each of the streamlined pads 108, 110, 112, and 114 is stepped in the middle of its height. That is, the pad 108 has a thin stem portion 108a and a thick head portion (expanded end portion) 108b coming into contact with the disk surface. Similarly, the pads 110, 112, and 114 have thin stem portions 110a, 112a, and 114a and thick head portions 110b, 112b, and 114b, respectively.

Referring to FIG. 11, there is shown an enlarged view of the stepped pad 112 and the magnetic disk 20 in their contact condition. The pad 112 has a stepped portion 120 between the stem portion 112a and the head portion 112b. Reference numeral 116 denotes a protective film of the magnetic disk 20, and reference numeral 118 denotes a lubricant present on the protective film 116. Owing to the stepped portion 120, the lubricant 118 scraped by the head portion 112b hardly rises beyond the stepped portion 120 by surface tension, thereby allowing a reduction in probability of formation of a meniscus of the lubricant 118 on the rail surface 50a of the rail 50. Accordingly, an increase in frictional force and sticking force between the slider 32E and the disk surface can be prevented.

Even if the lubricant 118 rises beyond the stepped portion 120 to reach the rail surface 50a of the rail 50, a contact area between the lubricant 118 and the rail surface 50a can be made smaller than that in the case that the thickness of each pad is uniform. As a result, an increase in frictional force and sticking force between the slider 32E and the disk surface can be prevented.

Having thus described the specific preferred embodiments of the present invention applied to a magnetic disk drive, the present invention is applicable also to an optical disk drive having a flying head slider.

As described above, according to the present invention, the streamlined pads are formed on the rails of the head slider to thereby suppress scraping of the lubricant on the disk by the pads. As a result, an increase in frictional force and sticking force between the head slider and the disk surface due to the scraped lubricant can be suppressed.

Furthermore, the reliability and durability of the disk drive can be improved to thereby extend the life of the disk drive. Accordingly, a load on the motor at starting the disk drive can be reduced to thereby allow the use of a compact motor. As a result, the disk drive can be reduced in size and power consumption.

What is claimed is:

1. A head slider having an air inlet end facing an air flow generated by a rotating disk and entering said head slider and an air outlet end, where the air flow exits said head slider, comprising:

a pair of rails formed on a disk opposing surface opposed to the disk, each of said rails having a flat air bearing surface for generating a flying force during rotation of the disk, and a tapering surface formed near the air inlet end and extending continuously to said air bearing surface; and a plurality of pads formed on said air bearing surfaces of said rails in the vicinity of the air inlet end and in the vicinity of the air outlet end, each of said pads having a front arcuate portion facing the air flow entering said head slider, a first straight edge extending from a first side of said front arcuate portion toward a longitudinal center line of said pad, and a second straight edge extending from a second side of said front arcuate portion toward said longitudinal center line of said pad, said first and second straight edges being at a predetermined angle with respect to said longitudinal center line on first and second sides of said longitudinal center line on a horizontal plane, respectively.

2. A head slider according to claim 1, wherein each said pad is inclined a given angle to a longitudinal center line of said head slider so that when said head slider is placed in a contactable zone of the disk, the longitudinal center line of each said pad extends in a direction substantially coinciding with a tangential direction of a circular track in said contactable zone of the disk.

3. A head slider according to claim 1, wherein each said pad has a hole substantially perpendicular to said air bearing surfaces.

4. A head slider according to claim 3, wherein said hole has a depth reaching said air bearing surfaces.

5. A head slider according to claim 1, wherein said pads formed in the vicinity of the air inlet end are higher in level than said pads formed in the vicinity of the air outlet end.

6. A head slider according to claim 5, further comprising an electromagnetic transducer formed on one of said rails in the vicinity of the air outlet end;

wherein said pads formed on said rail having said electromagnetic transducer are lower in level than said pads formed on the other rail on which said electromagnetic transducer is not formed.

7. A head slider according to claim 1, wherein each said pad has a stem portion projecting from said air bearing surface and a head portion formed continuously to said stem portion, said stem portion being thinner than said head portion to form a stepped portion therebetween.

8. A disk drive comprising:

a housing;

a disk rotatably mounted in said housing;

a head slider having a head for reading/writing data from/to said disk; and an actuator for moving said head slider across tracks of said disk;

said head slider comprising:

an air inlet end;

an air outlet end formed on the opposite side of said air inlet end;

a pair of rails formed on a disk opposing surface opposed to said disk, each of said rails having a flat air bearing surface for generating a flying force during rotation of said disk, and a tapering surface formed near said air inlet end and extending continuously to said air bearing surface; and a plurality of streamlinedpads formed on said airbearing surfaces of said rails in the vicinity of said air inlet end and in the vicinity of said air outlet end, said pads having a front arcuate portion and a rear portion which tapers from said front arcuate portion toward said air outlet end, said arcuate portion having a radius R facing said air inlet end, a width D1 in a direction perpendicular to an innermost air entering direction, and a width D2 in a direction perpendicular to an outermost air entering direction of the head slider, such that D1=D2=2R, said rear portion having two straight side edges forming an angle $\theta$ therebetween, such that a sum of an absolute value of an inner yaw angle $\theta1$ between a longitudinal center line and an inner side edge of said two straight side edges of a corresponding pad and an absolute value of an outer yaw angle $\theta2$ between said longitudinal center line and an outer side edge of said two straight side edges of said corresponding pad equals said angle $\theta$.

* * * * *

UNITED STATES PATENT AND TRADEMARK OFFICE
CERTIFICATE OF CORRECTION

PATENT NO. : 6,185,071 B1  Page 1 of 1
DATED : February 6, 2001
INVENTOR(S) : Asanai et al.

It is certified that error appears in the above-identified patent and that said Letters Patent is hereby corrected as shown below:

Column 10,
Line 25, please delete "srteamlinedpads" and insert -- streamlined pads --.
Line 25, please delete "airbearing" and insert -- air bearing --.

Signed and Sealed this

Eighth Day of January, 2002

Attest:

JAMES E. ROGAN
Attesting Officer  Director of the United States Patent and Trademark Office